United States Patent
Shang et al.

(10) Patent No.: US 10,747,465 B2
(45) Date of Patent: Aug. 18, 2020

(54) PRESERVING REPLICATION TO A STORAGE OBJECT ON A STORAGE NODE

(71) Applicant: EMC IP Holding Company LLC, Hopkinton, MA (US)

(72) Inventors: Qiu Shang, Shanghai (CN); Vasu Subramanian, Chapel Hill, NC (US); Qi Qu, Shanghai (CN); Tianfang Xiong, Shanghai (CN); Yue Qian, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

(21) Appl. No.: 16/175,162

(22) Filed: Oct. 30, 2018

(65) Prior Publication Data

US 2020/0133500 A1     Apr. 30, 2020

(51) Int. Cl.
| | | |
|---|---|---|
| *G06F 12/00* | (2006.01) | |
| *G06F 3/06* | (2006.01) | |
| *G06F 11/20* | (2006.01) | |
| *G06F 16/178* | (2019.01) | |

(52) U.S. Cl.
CPC .............. *G06F 3/065* (2013.01); *G06F 3/067* (2013.01); *G06F 3/0619* (2013.01); *G06F 11/2074* (2013.01); *G06F 16/178* (2019.01)

(58) Field of Classification Search
CPC .... G06F 3/065; G06F 16/178; G06F 11/2074; G06F 3/0619; G06F 3/067
USPC ........................................................ 711/154
See application file for complete search history.

(56) References Cited

U.S. PATENT DOCUMENTS

| | | |
|---|---|---|
| 7,769,722 B1 | 8/2010 | Bergant et al. |
| 8,156,195 B2 | 4/2012 | Hagglund et al. |
| 8,332,687 B1 | 12/2012 | Natanzon et al. |
| 8,335,771 B1 | 12/2012 | Natanzon et al. |
| 8,694,700 B1 | 4/2014 | Natanzon et al. |
| 8,706,833 B1 | 4/2014 | Bergant et al. |
| 9,026,696 B1 | 5/2015 | Natanzon et al. |
| 9,152,578 B1 | 10/2015 | Saad et al. |
| 9,323,750 B2 | 4/2016 | Natanzon et al. |
| 9,383,928 B2 | 7/2016 | Webman et al. |
| 9,569,455 B1 | 2/2017 | Bono et al. |
| 9,658,797 B1 | 5/2017 | Elliott, IV et al. |
| 10,289,325 B1 | 5/2019 | Bono |
| 10,498,821 B1 | 12/2019 | Bono et al. |
| 10,552,072 B1 | 2/2020 | Bono et al. |
| 2007/0283186 A1 | 12/2007 | Madnani et al. |
| 2007/0288526 A1 | 12/2007 | Mankad et al. |
| 2007/0294319 A1 | 12/2007 | Mankad et al. |

(Continued)

*Primary Examiner* — Mardochee Chery
(74) *Attorney, Agent, or Firm* — BainwoodHuang

(57) ABSTRACT

A technique preserves replication to a storage node. The technique involves, from a first storage node, sending a replication query to a second storage node. The technique further involves, in response to the replication query sent to the second storage node, receiving replication session data from the second storage node. The replication session data describes replication which has terminated from a third storage node to the second storage node for a particular storage object. The technique further involves, based on the replication session data, establishing replication from the first storage node to the second storage node for the particular storage object to preserve use of the particular storage object.

22 Claims, 7 Drawing Sheets

(56) References Cited

U.S. PATENT DOCUMENTS

| | | | |
|---|---|---|---|
| 2009/0030986 A1* | 1/2009 | Bates | G06F 3/0607 |
| | | | 709/205 |
| 2011/0093855 A1 | 4/2011 | Kast | |
| 2014/0304380 A1 | 10/2014 | Waas et al. | |
| 2016/0048430 A1* | 2/2016 | Bolik | G06F 11/1448 |
| | | | 711/162 |

* cited by examiner

PRESERVING REPLICATION TO A STORAGE OBJECT ON A STORAGE NODE

BACKGROUND

A data storage system saves and retrieves host data on behalf of one or more hosts. Such a data storage system may replicate production host data from one site to multiple other sites.

For example, Site A may perform synchronous replication of production host data to Site B, and perform asynchronous replication of the production host data to Site C. In such a situation, Site B operates as a possible failover site, and Site C operates to backup the production host data stored at Site A.

SUMMARY

It should be understood that there are deficiencies to existing replication approaches. For example, in the above described situation, it is expensive to failover to Site B and then configure Site C to backup the production host data from Site B. In particular, for this to happen, a previous asynchronous replication session from Site A to Site C is first deleted, and then a new asynchronous replication session from Site B to Site C is created. Unfortunately, such operation requires copying all of the production host data from Site B to Site C (i.e., an expensive endeavor) before the new asynchronous replication session from Site B to Site C can begin. Moreover, a similar process must be performed to transition back to having Site A store the production host data, Site B operate as the possible failover site, and Site C operate to backup the production host data stored at Site A.

In contrast to the above-described above described situation, improved techniques are directed to preserving replication to a storage object on a storage node by preserving the ability to replicate to the storage object from different storage nodes. Along these lines, the techniques enable establishing replication from a first storage node to a second storage node for a storage object following termination of replication from a third storage node to the second storage node for the storage object. Such operation preserves use of the storage object on the second storage node (e.g., following a failover event or failback event). In particular, a non-current version of the storage object on the second storage node is simply updated with changes to match a current version of the storage object on the first storage node before resuming replication to the storage object. Such operation alleviates the need to transfer the entire current version of the storage object from the first storage node to the second storage node prior to replicating to the second storage node.

One embodiment is directed to a method of preserving replication to a storage node. The method includes, from a first storage node, sending a replication query to a second storage node. The method further includes, in response to the replication query sent to the second storage node, receiving replication session data from the second storage node. The replication session data describes replication which has terminated between a third storage node and the second storage node for a particular storage object (from the third storage node to the second storage node, or from the second storage node to the third storage node). The method further includes, based on the replication session data, establishing replication from the first storage node to the second storage node for the particular storage object to preserve use of the particular storage object.

In some arrangements, prior to establishing replication from the first storage node to the second storage node, (i) a current version of the particular storage object resides on the first storage node and (ii) a non-current version of the particular storage object resides on the second storage node. Additionally, establishing replication from the first storage node to the second storage node for the particular storage object includes updating the non-current version of the particular storage object residing on the second storage node to match the current version of the particular storage object residing on the first storage node.

In some arrangements, updating the non-current version of the particular storage object residing on the second storage node to match the current version of the particular storage object residing on the first storage node includes:
  (i) identifying a set of changes between the non-current version of the particular storage object residing on the second storage node and the current version of the particular storage object residing on the first storage node, and
  (ii) sending only the set of changes from the first storage node to the second storage node to update the non-current version of the particular storage object residing on the second storage node in lieu of sending an entire copy of the current version of the particular storage object from the first storage node to the second storage node.

In some arrangements, the current version of the particular storage object is formed from synchronous replication from the third storage node to the first storage node prior to a failover event. Additionally, the non-current version of the particular storage object stored by the second storage node is formed by asynchronous replication from the third storage node to the second storage node prior to the failover event. Furthermore, establishing replication from the first storage node to the second storage node further includes, after the set of changes is sent from the first storage node to the second storage node to update the non-current version of the particular storage object, performing asynchronous replication from the first storage node to the second storage node for the particular storage object.

In some arrangements, prior to sending the replication query, asynchronous replication is performed from the third storage node to the second storage node for the particular storage object. Additionally, sending the replication query to the second storage node includes providing the replication query to the second storage node after the asynchronous replication from the third storage node to the second storage node for the particular storage object has been terminated.

In some arrangements, the asynchronous replication from the third storage node to the second storage node for the particular storage object is performed via an asynchronous replication session between the third storage node and the second storage node having (i) a replication session identifier that uniquely identifies the asynchronous replication session among other replication sessions and (ii) a recovery point objective (RPO) that identifies a target period in which data for the particular storage object might be lost due to an incident. Additionally, receiving the replication session data from the second storage node includes acquiring, as at least a portion of the replication session data, the replication session identifier and the RPO from the second storage node.

In some arrangements, establishing replication from the first storage node to the second storage node for the particular storage object includes establishing an asynchronous replication session between the first storage node and the second storage node based on the replication session identifier and the RPO from the second storage node. Accordingly, utilization of the particular storage object is preserved.

In some arrangements, the method further includes, while establishing replication from the first storage node to the second storage node for the particular storage object, concurrently establishing replication from the first storage node to the third storage node for the particular storage object.

In some arrangements, establishing replication from the first storage node to the second storage node for the particular storage object includes establishing an asynchronous replication session between the first storage node and the second storage node for the particular storage object, and activating the asynchronous replication session to perform asynchronous replication from the first storage node to the second storage node for the particular storage object. Additionally, concurrently establishing replication from the first storage node to the third storage node for the particular storage object includes establishing a synchronous replication session between the first storage node and the third storage node for the particular storage object, and activating the synchronous replication session to perform synchronous replication from the first storage node to the third storage node for the particular storage object.

In some arrangements, activating the asynchronous replication session includes transitioning the asynchronous replication session to an active state. Additionally, the method further includes, after the asynchronous replication session has been in the active state for a period of time, transitioning the asynchronous replication session from the active state to a hibernated state to deactivate replication from the first storage node to the second storage node for the particular storage object and enable the third storage node to perform replication to the second storage node for the particular storage object.

In some arrangements, the method further includes, prior to sending the replication query to the second storage node, performing replication to the second storage node for the particular storage object, and terminating replication to the second storage node for the particular storage object.

In some arrangements, performing replication to the second storage node for the particular storage object includes establishing an asynchronous replication session between the first storage node and the second storage node for the particular storage object, and activating the asynchronous replication session to perform synchronous replication from the first storage node to the second storage node for the particular storage object. Additionally, terminating replication to the second storage node for the particular storage object includes deactivating the asynchronous replication session in response to a failover event.

In some arrangements, activating the asynchronous replication session includes transitioning the asynchronous replication session to an active state. Additionally, deactivating the asynchronous replication session includes transitioning the asynchronous replication session from the active state to a hibernated state. Furthermore, establishing replication from the first storage node to the second storage node for the particular storage object includes transitioning the asynchronous replication session from the hibernated state back to the active state to reactivate the asynchronous replication session.

In some arrangements, sending the replication query to the second storage node includes directing the second storage node to provide a list of replication sessions established between the third storage node and the second storage node.

In some arrangements, receiving the replication session data from the second storage node includes obtaining the list of replication sessions established between the third storage node and the second storage node. The list of replication sessions identifies multiple inactive replication sessions established between the third storage node and the second storage node.

In some arrangements, the method further includes, while establishing replication from the first storage node to the second storage node for the particular storage object, establishing replication from the first storage node to the second storage node for other storage objects based on the multiple inactive replication sessions identified by the list.

In some arrangements, prior to establishing replication from the first storage node to the second storage node for the particular storage object, an earlier asynchronous replication session from the third storage node to the second storage node for the particular storage object is hibernated. Additionally, establishing replication from the first storage node to the second storage node for the particular storage object includes reusing internal replication components at the second storage node to perform asynchronous replication from the first storage node to the second storage node.

Another embodiment is directed to data storage equipment operating as a first storage node. The data storage equipment includes a communications interface, memory, and control circuitry coupled with the communications interface and the memory. The memory stores instructions which, when carried out by the control circuitry, causes the control circuitry to:

(A) send a replication query to a second storage node through the communications interface, (B) in response to the replication query sent to the second storage node, receive replication session data from the second storage node through the communications interface, the replication session data describing replication which has terminated between a third storage node and the second storage node for a particular storage object, and (C) based on the replication session data, establish replication to the second storage node for the particular storage object to preserve use of the particular storage object.

Yet another embodiment is directed to a computer program product having a non-transitory computer readable medium which stores a set of instructions to preserve replication to a storage node. The set of instructions, when carried out by a first storage node, causes the first storage node to perform a method of:

(A) from the first storage node, sending a replication query to a second storage node;

(B) in response to the replication query sent to the second storage node, receiving replication session data from the second storage node, the replication session data describing replication which has terminated between a third storage node and the second storage node for a particular storage object; and (C) based on the replication session data, establishing replication from the first storage node to the second storage node for the particular storage object to preserve use of the particular storage object.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in preserving replication to a storage object on a storage node.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to preserving the ability to replicate to a storage object from different storage nodes. Along these lines, such a technique involves establishing replication from a first storage node to a second storage node for the storage object following termination of replication from a third storage node to the second storage node for the storage object. Such operation preserves use of the storage object on the second storage node (e.g., following a failover event or failback event). In particular, a non-current version of the storage object on the second storage node is simply updated with changes to match a current version of the storage object on the first storage node before replicating from the first storage node to the second storage node for the storage object. Such operation alleviates the need to transfer the entire current version of the storage object from the first storage node to the second storage node prior to replicating to the second storage node.

Figure 1:
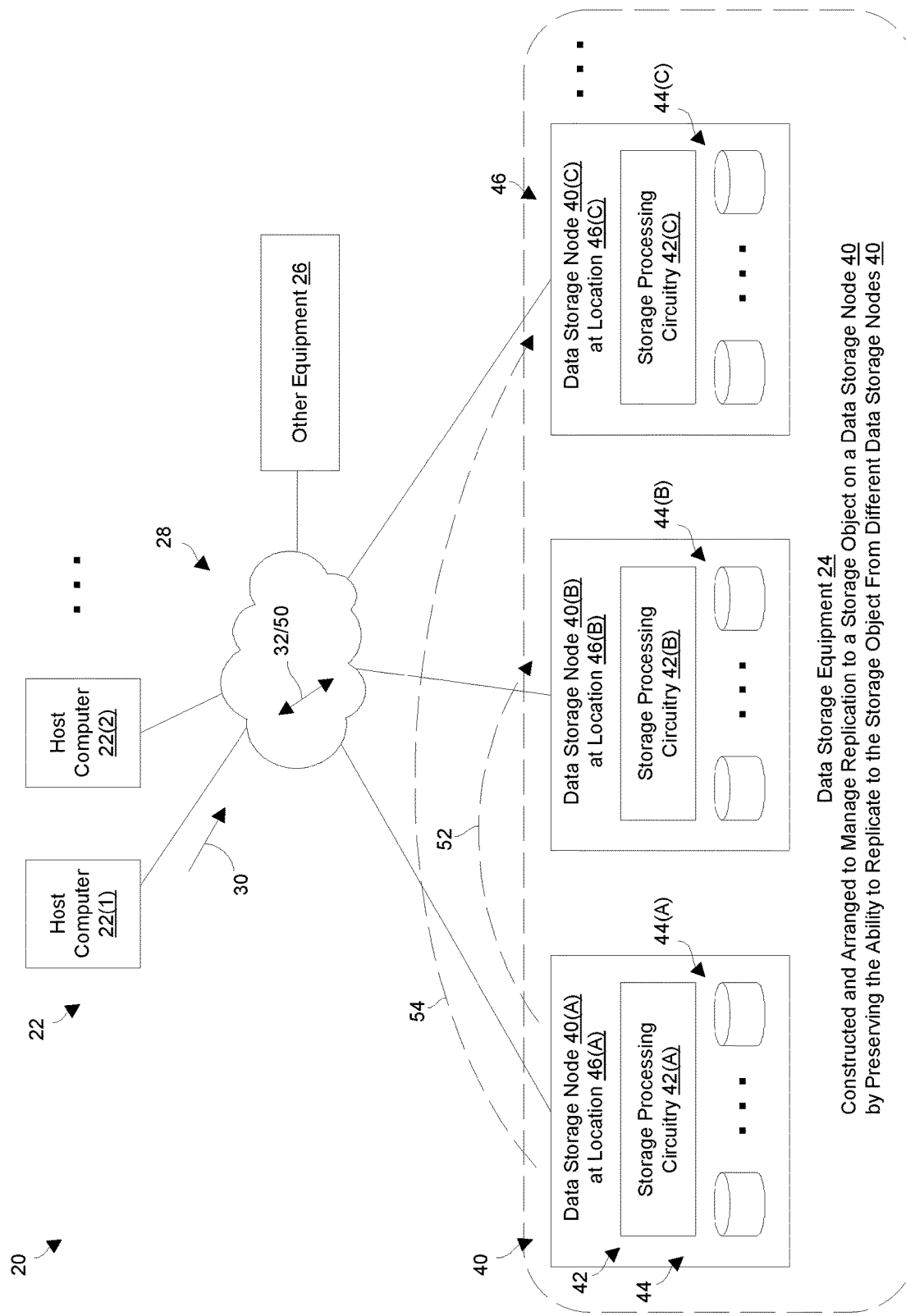
FIG. 1 is a block diagram of a data storage environment within which replication to a storage object on a storage node is preserved in accordance with certain embodiments.

FIG. 1 shows a data storage environment 20 within which replication to a storage object on a storage node is preserved in accordance with certain embodiments. The data storage environment 20 includes host computers 22(1), 22(2), . . . (collectively, host computers 22), data storage equipment 24, other equipment 26, and a communications medium 28.

Each host computer 22 is constructed and arranged to perform useful work. For example, one or more of the host computers 22 may operate as a file server, a web server, an email server, an enterprise server, a database server, a transaction server, combinations thereof, and the like which provides host input/output (I/O) requests 30 to the data storage equipment 24. In this context, the host computers 22 may provide a variety of different I/O requests 30 (e.g., file access requests, block-based access requests, combinations thereof, etc.) that direct the data storage equipment 24 to store host data 32 within and retrieve host data 32 from one or more data storage objects (e.g., a file, a file system, a logical unit of storage or LUN, a volume, a virtual volume or VVol, a file containing a volume, a file containing a file system, a volume containing a file system, etc.).

The data storage equipment 24 includes multiple data storage nodes 40(A), 40(B), 40(C) (collectively, data storage nodes 40). It should be understood that the data storage equipment 24 includes three data storage nodes 40 by way of example only, and that the data storage equipment 24 may include a different number of data storage nodes 40 (e.g., four, five, six, etc., . . . ).

Each data storage node 40 includes storage processing circuitry 42 and storage devices 44 (e.g., solid state drives, magnetic disk drives, combinations thereof, etc.). That is, the data storage node 40(A) includes storage processing circuitry 42(A) and storage devices 44(A). Likewise, the data storage node 40(B) includes storage processing circuitry 42(B) and storage devices 44(B), the data storage node 40(C) includes storage processing circuitry 42(C) and storage devices 44(C), and so on.

The storage processing circuitry 42 of each storage node 40 is constructed and arranged to respond to the host I/O requests 30 from the host computers 22 by writing host data 32 into the storage devices 44 on that storage node 40 and reading host data 32 from the storage devices 44 on that storage node 40. The storage processing circuitry 42 may include one or more physical storage processors or engines, data movers, director boards, blades, I/O modules, storage drive controllers, switches, other hardware, combinations thereof, and so on. While processing the host I/O requests 30, the storage processing circuitry 42 is constructed and arranged to provide a variety of specialized data storage system services such as caching, tiering, deduplication, compression, encryption, mirroring, providing RAID (redundant array of independent disks) protection, snapshotting, backup/archival services, replication, and so on.

The storage devices 44 may be co-located with the storage processing circuitry 42 (e.g., on the same rack, in the same chassis or cabinet, etc.). Alternatively, the storage devices 44 be separate from the storage processing circuitry 42 (e.g., in a separate enclosure, in a separate assembly/array, etc.).

It should be understood that the different storage nodes 40 may be distributed in different locations 46. By way of example only, the data storage node 40(A) resides at location 46(A), the data storage node 40(B) resides at location 46(B), the data storage node 40(C) resides at location 46(C), and so on.

It should be further understood that there is no requirement as to how far the different data storage nodes 24 must be separated. Rather, one or more of the storage nodes 24 may reside in the same room, on the same floor, in the same building, etc. Furthermore, one or more of the storage nodes 24 may reside in a different room, building, campus, city, state, coast, country, etc.

Moreover, the data storage equipment 24 is capable of performing different types of data storage operations. Along these lines, each data storage node 40 is able to store multiple storage objects and perform file-based operations, block-based operations, combinations thereof, etc. on the storage objects.

The other equipment 26 refers to other componentry of the data storage environment 20 that may be accessed by the host computers 22 and/or the data storage equipment 24, or other componentry that may be able to access the host computers 22 and/or the data storage equipment 24. For example, the other equipment 26 may include one or more user devices (e.g., a desktop, a laptop, a tablet, a smartphone, a terminal, etc.) which are able to access a host computer 22. As another example, the other equipment 26 may include a storage administrative device (e.g., a service processor) which is able to access the data storage equipment 24, and so on.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the host devices 22 send host I/O requests 30 to the data storage equipment 24 for processing. For example, a set of host computers 22 may write host data 32 to and read host data 32 from a particular storage object on a first storage node 40 at a first location 46. Furthermore, that storage node 40 may replicate the particular storage object to other storage nodes 40 at other locations 46. In this situation, the particular storage object on the first storage node 40 is referred to as the production storage object and the first storage node 40 at the first location 46 is referred to as the production site or replication source site. Additionally, the versions of the particular storage object (i.e., the production storage object) residing at the other storage nodes 40 at the other locations 46 are referred to as replicas at replication destination sites.

By way of example only and as shown in FIG. 1, a synchronous replication session has been established between the storage node 40(A) and the storage node 40(B) to synchronously replicate data from a production storage object on the storage node 40(A) to a replica of the production storage object on the storage node 40(B). This synchronous replication session is depicted by the dashed arrow 52 in FIG. 1.

In synchronous replication, each write operation is not considered fully completed until the written data is persisted at the production site and the replication destination site. Accordingly, synchronous replication enables certain features such as consistency between the production storage object and the replica of the production storage object for accommodating certain types of events such as planned failover (e.g., to perform updates, servicing, etc. at the production site), unplanned failover (e.g., loss of the production site due to a significant equipment failure, a power failure, etc.), and so on.

Also, by way of example only and as shown in FIG. 1, an asynchronous replication session has been established between the storage node 40(A) and the storage node 40(C) to asynchronously replicate data from the production storage object on the storage node 40(A) to a replica of the production storage object on the storage node 40(C). This asynchronous replication session is depicted by the dashed arrow 54 in FIG. 1.

In asynchronous replication, each write operation is considered fully completed when the written data is persisted at the production site. In such a situation, the changes to the data are buffered at the production site and periodically sent from the production site to the replication destination site based on a Recovery Point Objective (RPO), i.e., a target period in which data for the particular storage object might be lost due to an incident (e.g., 10 minutes, 15 minutes, 30 minutes, one hour, etc.). Accordingly, asynchronous replication enables certain features such as backups, remote storage of snapshots, and so on.

It should be understood that there may be other replication sessions that replicate the production storage object to other locations 46 as well. Moreover, there may be other replication sessions that replicate other storage objects among the various location 46 and in various different directions.

As will be described in further detail shortly, the data storage equipment 24 is able to preserve the ability to replicate to a storage object from different storage nodes. For example, suppose that failover occurs from the storage node 40(A) to the storage node 40(B). Such failover may be planned or unplanned.

During such an event, the replica of the particular storage object on the storage node 40(B) becomes the production storage object. Accordingly, the set of host computers 22 can continue to write host data 32 to the production storage node and read the host data 32 from the production storage node.

Additionally, the storage nodes 40(B) and 40(C) are able to coordinate with each other to preserve use of the replica of the production storage node at the storage node 40(C). In particular, the storage node 40(B) is able to resume replication from the storage node 40(B) to the storage node 40(C) for the storage object. Thus, the entire storage object does not need to be copied from the storage node 40(B) to the storage node 40(C) before replication from the storage node 40(B) to the storage node 40(C) for the storage object commences. Further details will now be provided with reference to FIG. 2.

Figure 2:
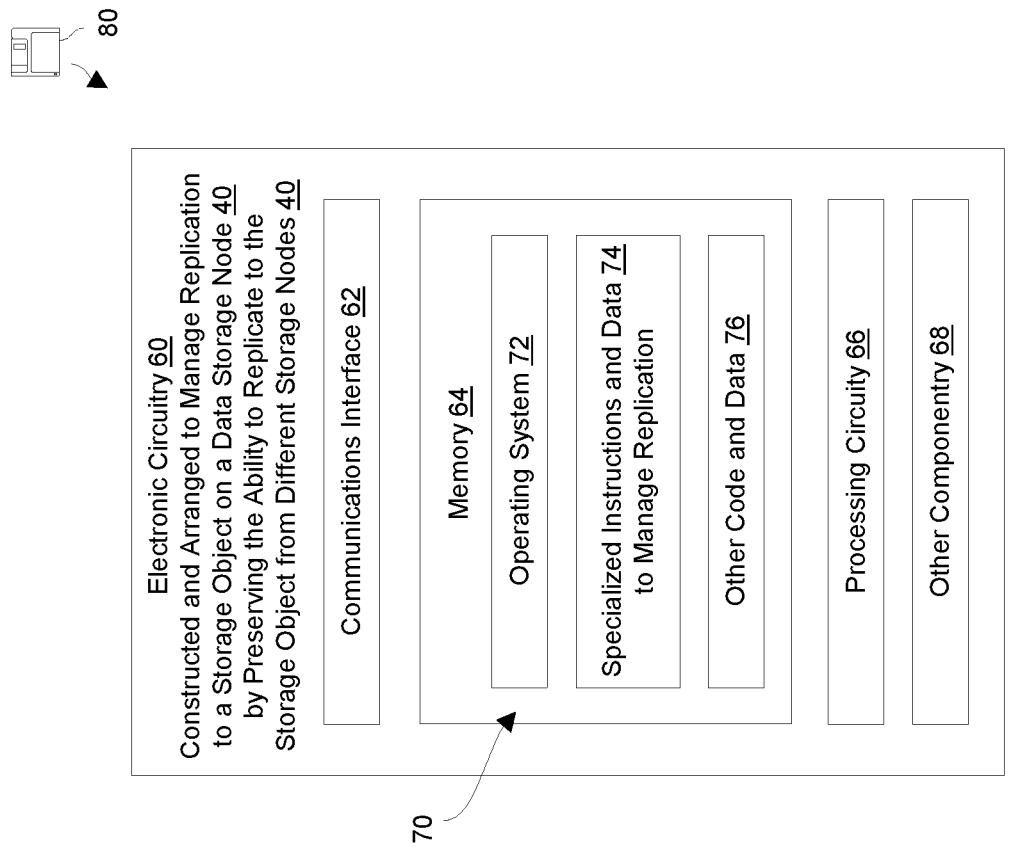
FIG. 2 is a block diagram of data storage equipment of the data storage environment of FIG. 1 in accordance with certain embodiments.

FIG. 2 shows an electronic circuitry 60 which is suitable for use within the data storage environment 20 (also see FIG. 1) in accordance with certain embodiments. Along these lines, the electronic circuitry 60 may form a part of the storage processing circuitry 42 of one or more of the data storage nodes 40 or may reside as separate circuitry within the data storage environment 24 (e.g., see the other equipment 26). The electronic circuitry 60 includes a communications interface 62, memory 64, and processing circuitry 66, and other componentry 68.

The communications interface 62 is constructed and arranged to connect the electronic circuitry 60 to the communications medium 28 (also see FIG. 1) to enable communications with other devices of the data storage environment 20 (e.g., the host computers 22, etc.). Such communications may be IP-based, SAN-based, cellular-based, cable-based, fiber-optic based, wireless, cloud-based, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized instructions and data 74, and other code and data 76. The operating system 72 refers to particular control code such as a kernel to manage computerized resources (e.g., processor cycles, memory space, etc.), drivers (e.g., an I/O stack), and so on. The specialized instructions and data 74 refers to code that enables electronic circuitry 60 to preserve replication to a storage object on a data storage node 40. In some arrangements, the specialized instructions and data 74 is tightly integrated with or part of the operating system 72 itself. The other code and data 76 refers to applications and routines to provide additional operations and services (e.g., performance measurement tools, etc.), user-level applications, administrative tools, utilities, and so on.

The processing circuitry 66 is constructed and arranged to operate in accordance with the various software constructs 70 stored in the memory 64. As will be explained in further detail shortly, the processing circuitry 66 executes the specialized instructions and data 74 to form specialized control circuitry that preserves the ability to replicate to a storage object from different storage nodes 40.

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic circuitry 60. In particular, the computer program product 80 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

The other componentry 68 refers to other hardware of the electronic circuitry 60. Along these lines, the electronic circuitry 60 may include storage device adaptors, a user interface, other specialized data storage hardware, etc. Further details will now be provided with reference to FIGS. 3 through 5.

Figure 3:
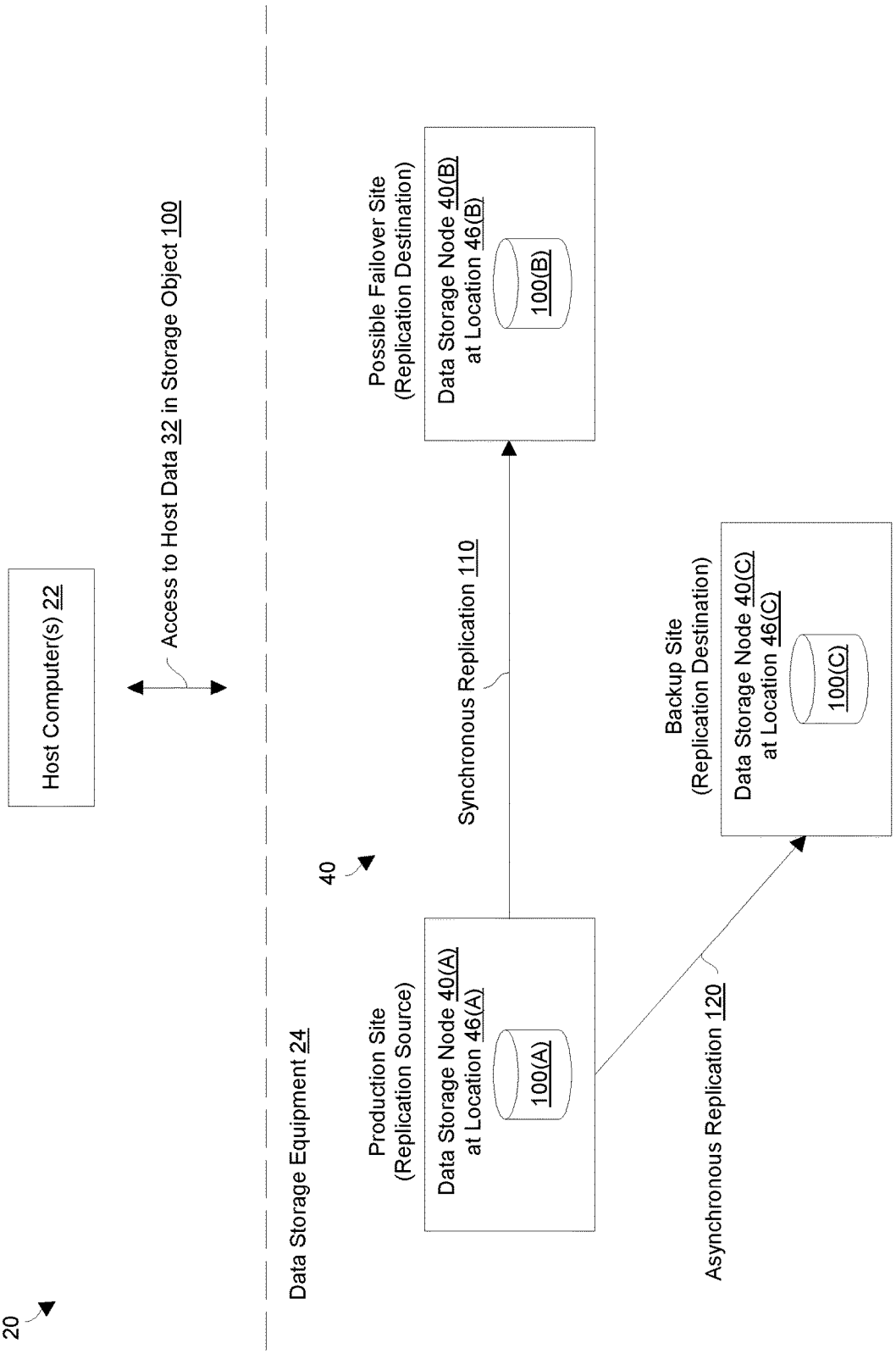
FIG. 3 is a block diagram illustrating particular details of an initial example situation in accordance with certain embodiments.
Figure 4:
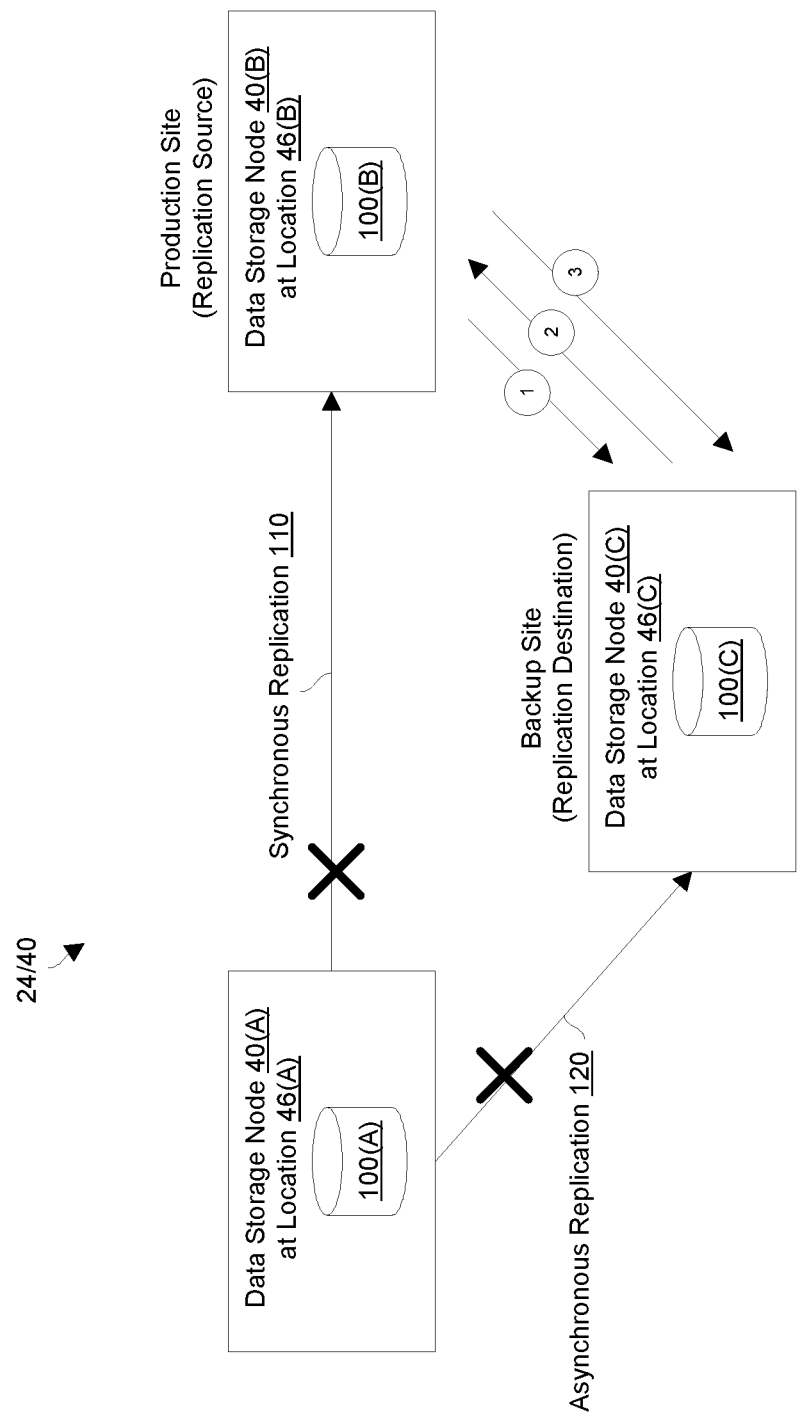
FIG. 4 is a block diagram illustrating particular details of how a replication to a storage object may be preserved in accordance with certain embodiments.
Figure 5:
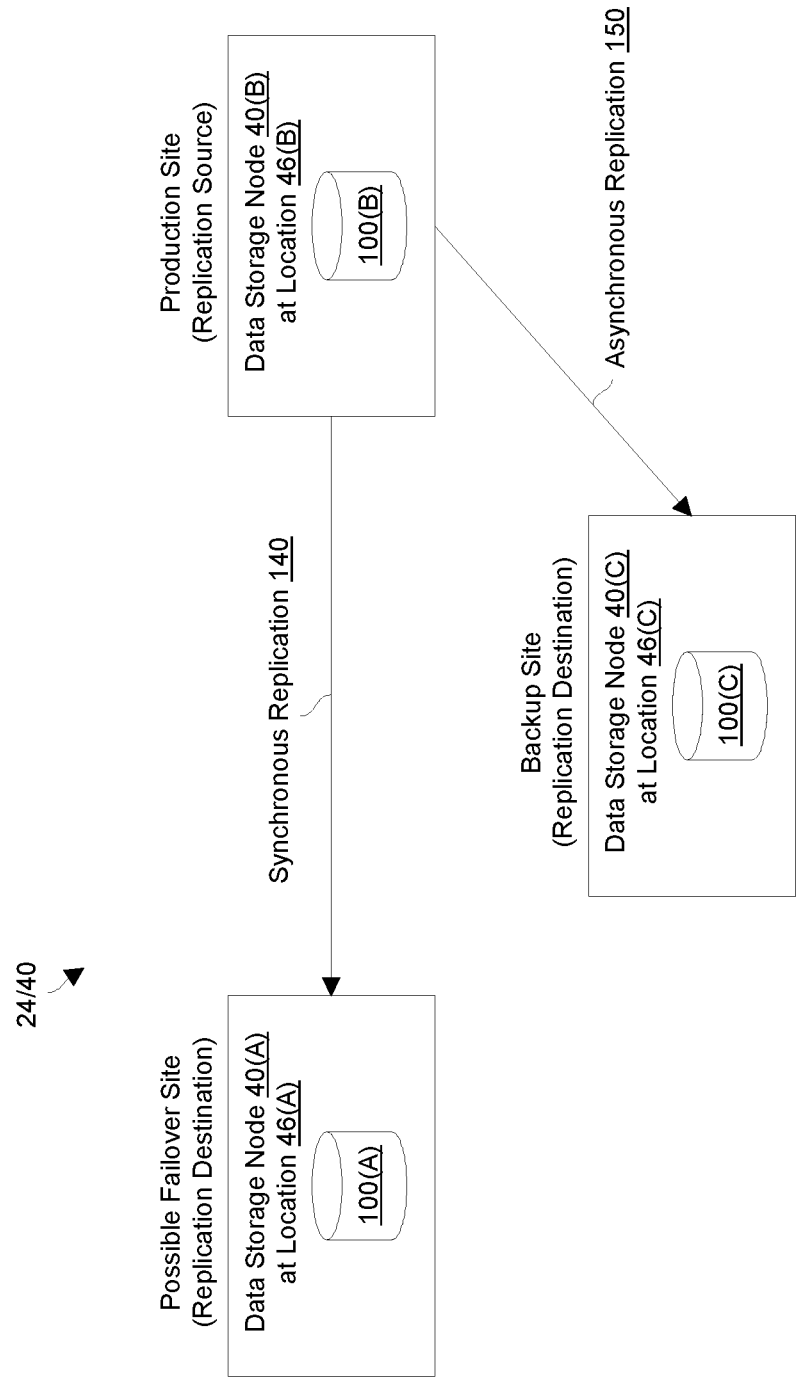
FIG. 5 is a block diagram illustrating particular details of a further example situation in accordance with certain embodiments.

FIGS. 3 through 5 show various details of an example situation in which the data storage equipment 24 of the data storage environment 20 is able to preserve the ability to replicate to a storage object 100 from different storage nodes 40. As shown in FIG. 3, one or more host computers 22 accesses a storage object 100 (e.g., a file system, a volume or LUN, etc.) which is managed by the data storage equipment 24. The data storage equipment 24 includes multiple data storage nodes 40(A), 40(B), 40(C) at locations 46(A), 46(B), 46(C), respectively, for storing host data 32 within the storage object 100 on behalf of the host computers 22.

With reference to FIG. 3, the storage node 40(A) at location 46(A) is initially the production site and the storage object 100(A) is initially considered the production storage object 100. Accordingly, the storage object 100(A) stores a current version of the host data 32 for the host computers 22.

Additionally, synchronous replication 110 is performed from the storage node 40(A) at location 46(A) to the storage node 40(B) at location 46(B) (depicted by the arrow 110 from the storage node 40(A) to the storage node 40(B)). Accordingly, any host I/O operations 30 (FIG. 1) that write host data 32 to the storage object 100(A) involve also writing the host data 32 to the storage object 100(B) before the host I/O operations 30 are acknowledged/considered completed. Thus, the storage object 100(B) also stores a current version of host data 32 for the host computers 22 thereby making the storage node 40(B) well suited for possible failover where the storage node 40(B) becomes the production site in place of the storage node 40(A) (e.g., due to a failure of the storage node 40(A), due to offlining the storage node 40(A) for maintenance or upgrading, etc.).

Furthermore, asynchronous replication 120 is performed from the storage node 40(A) at location 46(A) to the storage node 40(C) at location 46(C) (depicted by the arrow 120 from the storage node 40(A) to the storage node 40(C)). Here, any host I/O operations that write host data 32 to the storage object 100(A) can be acknowledged/considered completed as soon as the host data 32 is saved persistently in the storage node 40(A), and the changed host data 32 is buffered and periodically sent to the storage object 100(B) (e.g., based on a pre-specified RPO). Accordingly, the storage object 100(C) may at times store an older version of the host data 32 for the host computers 22. Thus, the storage node 40(C) well suited for maintaining backups (and/or snapshots) of the production storage object 100.

In accordance with certain embodiments, synchronous replication 110 from the storage node 40(A) to the storage node 40(B) is performed via a synchronous replication session that is established between the storage node 40(A) and the storage node 40(B). The synchronous replication session is formed using particular replication session data such as a replication session identifier (ID) that uniquely identifies the replication session among other replication sessions within the data storage equipment 24, a replication state (e.g., active, hibernated, etc.) identifying a current status of the replication session, a storage object identifier that uniquely identifies the particular storage object 100 within the data storage equipment 24 and/or within the storage node 40 among other storage objects, other resource identifiers, other operating parameters (e.g., owners, privileges, etc.), and so on.

Similarly, synchronous replication 120 from the storage node 40(A) to the storage node 40(C) is performed via an asynchronous replication session that is established between the storage node 40(A) and the storage node 40(C). The asynchronous replication session is formed using other replication session data such as another replication session ID that uniquely identifies the replication session among other replication sessions within the data storage equipment 24, a replication state (e.g., active, hibernated, etc.) identifying a current status of the replication session, a storage object ID that uniquely identifies the particular storage object 100 within the data storage equipment 24 and/or within the storage node 40 among other storage objects, other resource identifiers, other operating parameters (e.g., an RPO, owners, privileges, etc.), and so on.

FIG. 4 shows a situation in which the storage node 40(A) no longer operates as the production site for the storage object 100(A). Such a situation may occur due to a planned event (e.g., maintenance, an update, etc.) or unplanned event (e.g., a significant failure, power loss, etc.).

In the situation of FIG. 4, the storage node 40(B) is able to begin operation as the production site for the storage object 100(A). In particular, the storage node 40(B) is able to process host I/O operations 30 from the host computers 22.

Additionally, the storage node 40(B) is able to preserve using the storage object 100(C) on the storage node 40(C) even though the storage node 40(A) had previously perform asynchronous replication to the storage node 40(C) for the storage object 100(C). To this end, the storage node 40(B) sends a replication query to the storage node 40(C) (arrow 1 in FIG. 4). In some arrangements, the replication query is a broad request that asks the storage node 40(C) to provide back a list of all storage object replication responsibilities and their current status. In other arrangements, the replication query requests specific status for the storage object 100(C).

In response to the replication query, the storage node 40(C) provides a response containing replication session data describing the asynchronous replication session which has terminated from the storage node 40(A) to the storage node 40(C) for the storage object 100(C) (arrow 2 in FIG. 4). In some arrangements, the response includes a list of all storage object replication responsibilities and their current status. In other arrangements, the response simply includes specific status for the storage object 100(C). It should be appreciated that, in some arrangements, the replication request and response exchanged between the storage nodes 40(B), 40(C) may involve several communications back and forth as well as include additional information.

Upon receipt of the response, the storage node 40(B) establishes replication from the storage node 40(B) to the storage node 40(C) for the storage object 100(C) to preserve use of the storage object 100(C) that already exists on the storage node 40(C) (arrow 3 in FIG. 4). In particular, the storage node 40(B) uses the replication session data to properly identify a version of the storage object 100 residing on the storage node 40(C) (i.e., the storage object 100(C)).

It should be understood that the storage object 100(C) may be an older version of the storage object 100(B). If the storage object 100(C) is older than the current version of the storage object 100(B) residing on the storage node 40(B) (i.e., the storage object 100(B)), the storage node 40(B) sends updates to the storage node 40(C) enabling the storage node 40(C) to update the storage object 100(C) so that the storage object 100(C) on the storage node 40(C) matches the storage object 100(B) on the storage node 40(B).

Once the storage object 100(C) on the storage node 40(C) has been updated, the storage node 40(C) is ready to operate as a replication destination for replication from the storage node 40(B) to the storage node 40(C) for the storage object 100. At this point, the storage node 40(B) establishes an asynchronous replication session with the storage node 40(C) to asynchronously replicate the storage object 100. Accordingly, the storage node 40(B) has been able to preserve use of the storage object 100(C) by sending updates to the storage node 40(C) thus alleviating the need to send a full copy of the storage object 100(B) to the storage node 40(C).

Furthermore, once the event at the storage node 40(A) has been addressed, the storage node 40(B) is able to establish a synchronous replication session with the storage node 40(A) to perform synchronous replication to the storage node 40(A) for the storage object 100 at the same time as asynchronously replicating to the storage node 40(C) for the storage object 100.

Additionally, in situations where the storage node 40(B) receives a list of replication sessions established between the storage node 40(A) and the storage node 40(C), the list of replication sessions may identify multiple inactive replication sessions established between the storage node 40(A) and the storage node 40(C). In certain situations, the storage node 40(B) may establish replication from the storage node 40(B) and the storage node 40(C) for other storage objects based on the multiple inactive replication sessions identified by the list.

FIG. 5 shows the situation after the storage node 40(B) has established synchronous replication 140 to the storage node 40(A) for the storage object 100 (depicted by the arrow 140 from the storage node 40(B) to the storage node 40(A), and asynchronous replication 150 to the storage node 40(C) for the storage object 100 (depicted by the arrow 150 from the storage node 40(B) to the storage node 40(C). At this point, the storage node 40(A) is well suited for potential failover where the storage node 40(A) becomes the production site in place of the storage node 40(B), and the storage node 40(C) effectively maintains backups (and/or snapshots) of the production storage object 100.

One should appreciate that the situation shown in FIG. 5 may be sustained indefinitely. Alternatively, the situation in FIG. 5 may be restored to the situation shown in FIG. 3 using the same techniques described above. In particular, failover may be performed from the storage node 40(B) to the storage node 40(A) while the ability to perform asynchronous replication to the storage object 100(C) on the storage node 40(C) is preserved and then used as the replication destination once the storage node 40(A) resumes as the production site for the storage object 100. Again, for this transition, there is no need to send a complete copy of the storage object 100(A) to the storage node 40(C). Rather, the storage object 100(C) is not deleted but continued to be used in asynchronous replication from a different storage node 40.

One should further appreciate that the above described preservation of the storage object 100(C) as a replication destination by different storage nodes 40(A), 40(B) may be enabled by hibernating replication sessions on the storage nodes 40(A), 40(B). That is, before asynchronous replication begins between a replication source and a replication destination, the storage node 40 operating as the production site establishes the asynchronous replication session (also recall the replication session data described above), and then transitions the asynchronous replication session to the active state. When the asynchronous replication session is in the active state, various resources/services are in operation to provide asynchronous replication (e.g., internal components, registering, scheduling, etc.).

To formally hibernate the asynchronous replication session (i.e., stop asynchronous replication but preserve the ability of the storage node 40 to easily restart asynchronous replication), the storage node 40 transitions the asynchronous replication session from the active state to the hibernated state. Here, the storage node 40 does not delete the asynchronous replication session but instead suspends the asynchronous replication session (e.g., preserving the replication session data and releasing the scheduler).

In the situation of a planned failover, the storage node 40 is able to transition the asynchronous replication session from the active state to the hibernated state before the storage node 40 fails over to another storage node as the production site. However, if failover is unexpected, the storage node 40 transitions the asynchronous replication session from the active state to the hibernated state as soon as the storage node 40 resumes operation to avoid interfering with other storage nodes 40.

It should be understood that during a coordinated transition from one storage node 40 operating as the production site for the storage object 100 (e.g., the storage node 40(B) that stores the storage object 100(B)) to another storage node 40 operating as the failover site (e.g., the storage node 40(A) that stores the storage object 100(A)), there is simpler effort to switch asynchronous replication between replication sources. In particular, the current production site hibernates its asynchronous replication session. Then, the failover site queries the storage node 40(C) that stores the storage object 100(C) for possible changes to the replication session data (e.g., changes to the RPO, names, etc.), updates a the version of the storage object 100 (e.g., a previous snapshot of the storage object 100) if necessary, and transitions the previous asynchronous replication session that was hibernated from the hibernated state back to the active state to resume asynchronous replication to the storage node 40(C) that stores the storage object 100(C).

During such operation, the storage node 40(C) continues to serve as the replication destination for asynchronous replication to the storage object 100(C). Accordingly, the storage node 40(C) may be viewed simply as a backup repository for the data of the storage object 100.

It should be appreciated that hibernating an asynchronous replication session maintains certain replication resources. For example, if asynchronous replication from the storage node 40(A) to the storage node 40(C) for the storage object 100 is hibernated, subsequent asynchronous replication from the storage node 40(B) to the storage node 40(C) for the storage object 100 is able to reuse a variety of internal replication components at the storage node 40(C) (e.g., versions, versionSet, versionsetContext, etc.). Accordingly, performance in establishing asynchronous replication from the storage node 40(A) to the storage node 40(C) for the storage object 100 is significantly improved.

Figure 6:
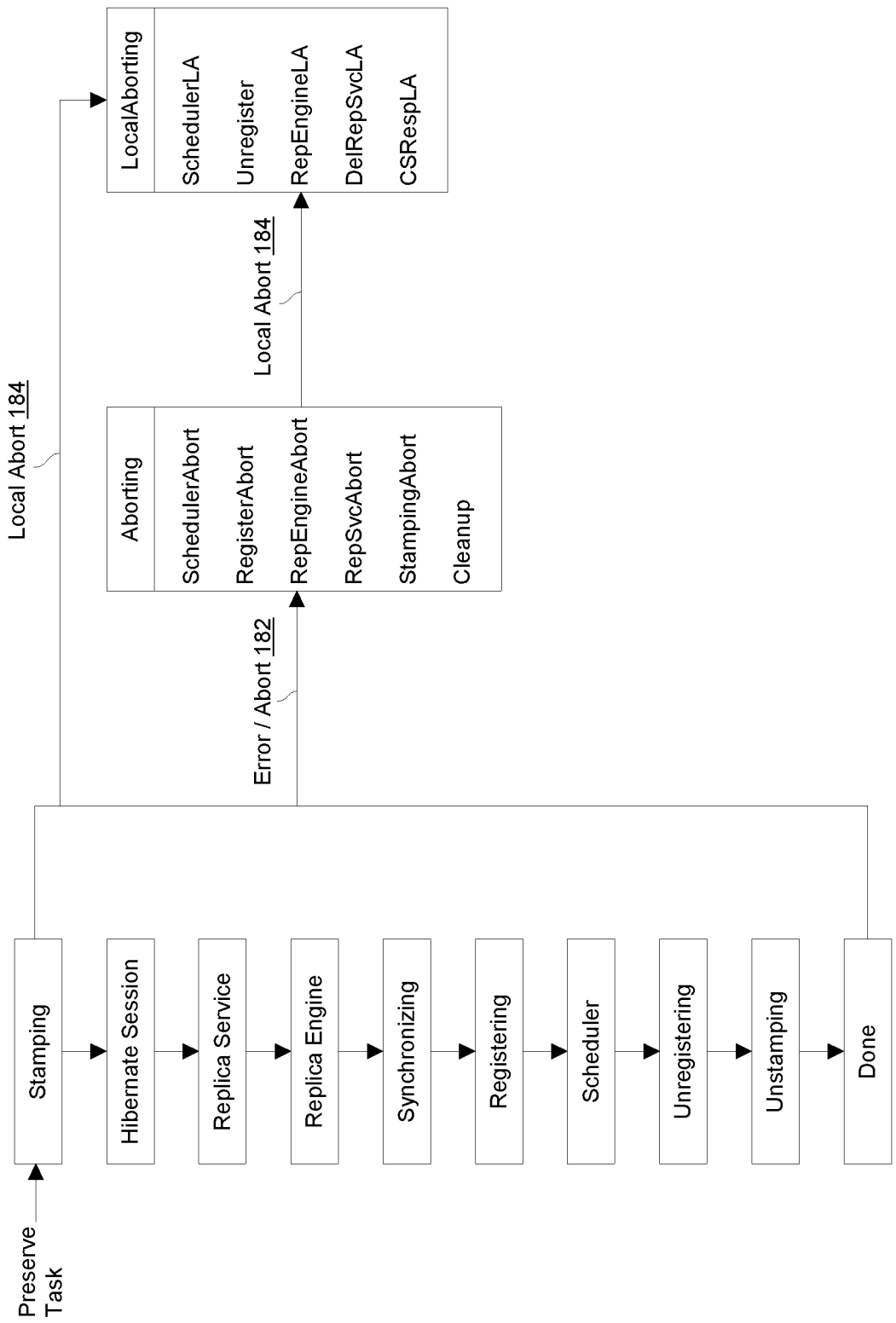
FIG. 6 is a block diagram of an example flow for a preserve operation in accordance with certain embodiments.

FIG. 6 shows particular flow details 180 for performing a preserve operation on an asynchronous replication session in accordance with certain embodiments. In particular, the flow begins in response to initiation of a preserve task. Furthermore, the normal flow proceeds in the downward direction through the following states: Stamping, Hibernating (where transitioning to the hibernation state occurs), Replica Service, Replica Engine, Synchronizing, Registering, Scheduler, Unregistering, and Unstamping.

Also shown in FIG. 6 are possible flows for abnormal cases. In particular, the flow details 180 include an error/abort flow 182. Additionally, the flow details 180 include local aborting flows 184. Further details will now be provided with reference to FIG. 7.

Figure 7:
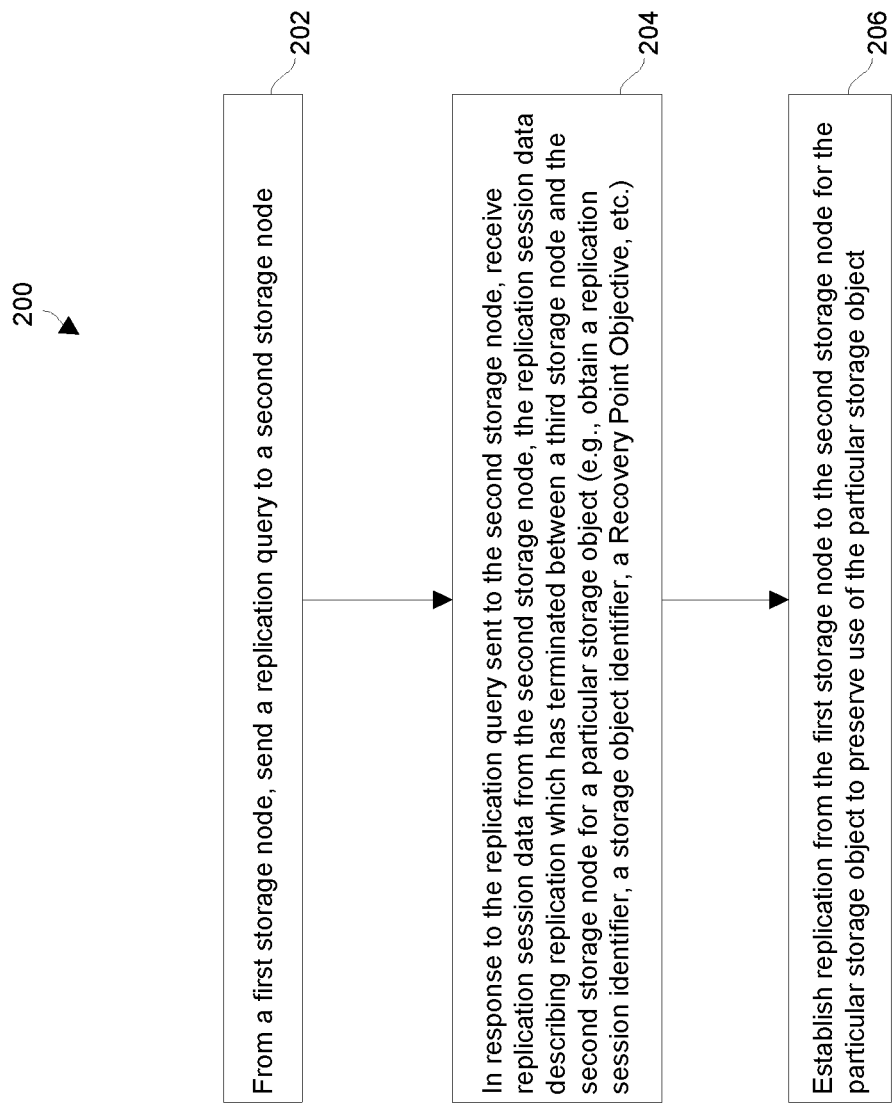
FIG. 7 is a flowchart of a procedure which is performed within the data storage environment of FIG. 1.

FIG. 7 is a flowchart of a procedure 200 which is performed by a first storage node 40 of the data storage equipment 24 when preserving replication to a second storage node. In particular, the procedure 200 preserves the ability to replicate to a storage object from different storage nodes thus alleviating the need to send a full copy of the storage object to the second storage node when resuming asynchronous replication.

At 202, the first storage node sends a replication query to a second storage node. Such operation may be performed in response to an automated failover operation, in response to a user command (e.g., from a storage administrator), and so on.

At 204, in response to the replication query sent to the second storage node, the first storage node receives replication session data from the second storage node, the replication session data describing replication which has terminated between a third storage node and the second storage node for a particular storage object (from the third storage node to the second storage node, or from the second storage node to the third storage node). Such replication session data may include a replication session identifier, current replication session status, a storage object ID that uniquely identifies the particular storage object within the data storage equipment 24 and/or within the storage node among other storage objects, other resource identifiers, other operating parameters (e.g., an RPO, owners, privileges, etc.), and so on. Additionally, the replication session data may be included with other replication session data for other replication sessions handled by the same second storage node (e.g., to enable further replication management of the other replication sessions).

At 206, the first storage node, based on the replication session data, establishes replication from the first storage node to the second storage node for the particular storage object. Such operation preserves use of the particular storage object.

As described above, improved techniques are directed to preserving replication to a storage object 100 on a storage node 40 by preserving the ability to replicate to the storage object 100 from different storage nodes 40. Along these lines, the techniques enable establishing replication from a first storage node 40 to a second storage node 40 for a storage object 100 following termination of replication from a third storage node 40 to the second storage node 40 for the storage object 100. Such operation preserves use of the storage object 100 on the second storage node 40 (e.g., following a failover event or failback event). In particular, a non-current version of the storage object 100 on the second storage node 40 is simply updated with changes to match a current version of the storage object 100 on the first storage node 40 before resuming replication to the storage object 100. Such operation alleviates the need to transfer the entire current version of the storage object 100 from the first storage node 40 to the second storage node 40 prior to replicating to the second storage node 40.

One should appreciate that the above-described techniques do not merely collect and store data. Rather, the disclosed techniques involve improvements to the technology of data replication. In particular, with the above-described techniques, there is greater resource utilization efficiency since a full copy of the production storage object does not need to be sent between storage nodes to resume asynchronous replication (e.g., less I/O operations, less communications traffic, etc.). Other advantages are available as well such as the ability to transfer use of a storage object as an asynchronous replication destination between different storage nodes, the ability to handle multiple asynchronous replication sessions at the same time, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Additionally, for the storage object that was preserved, it should be understood that asynchronous replication was described as initially occurring from another storage node 40 to the storage node 40 having the storage object. In other arrangements, asynchronous replication initially occurs in the opposite direction from the storage node 40 having the storage object to another storage node 40. Such modifications and enhancements are intended to belong to various embodiments of the disclosure.

What is claimed is:

1. A method of preserving replication to a storage node, the method comprising:
   from a first storage node, sending a replication query to a second storage node;
   in response to the replication query sent to the second storage node, receiving replication session data from the second storage node, the replication session data describing replication which has terminated between a third storage node and the second storage node for a particular storage object; and
   based on the replication session data, establishing replication from the first storage node to the second storage node for the particular storage object to preserve use of the particular storage object;
   wherein, prior to establishing replication from the first storage node to the second storage node, (i) a current version of the particular storage object resides on the first storage node and (ii) a non-current version of the particular storage object resides on the second storage node; and
   wherein establishing replication from the first storage node to the second storage node for the particular storage object includes:
      updating the non-current version of the particular storage object residing on the second storage node to match the current version of the particular storage object residing on the first storage node.

2. A method as in claim 1 wherein updating the non-current version of the particular storage object residing on the second storage node to match the current version of the particular storage object residing on the first storage node includes:
   identifying a set of changes between the non-current version of the particular storage object residing on the second storage node and the current version of the particular storage object residing on the first storage node, and
   sending only the set of changes from the first storage node to the second storage node to update the non-current version of the particular storage object residing on the second storage node in lieu of sending an entire copy of the current version of the particular storage object from the first storage node to the second storage node.

3. A method as in claim 2 wherein the current version of the particular storage object is formed from synchronous replication from the third storage node to the first storage node prior to a failover event;
   wherein the non-current version of the particular storage object stored by the second storage node is formed by asynchronous replication from the third storage node to the second storage node prior to the failover event; and
   wherein establishing replication from the first storage node to the second storage node further includes:
      after the set of changes is sent from the first storage node to the second storage node to update the non-current version of the particular storage object, performing asynchronous replication from the first storage node to the second storage node for the particular storage object.

4. A method as in claim 1 wherein, prior to sending the replication query, asynchronous replication is performed from the third storage node to the second storage node for the particular storage object; and
   wherein sending the replication query to the second storage node includes:
      providing the replication query to the second storage node after the asynchronous replication from the third storage node to the second storage node for the particular storage object has been terminated.

5. A method as in claim 4 wherein the asynchronous replication from the third storage node to the second storage node for the particular storage object is performed via an asynchronous replication session between the third storage node and the second storage node having (i) a replication session identifier that uniquely identifies the asynchronous replication session among other replication sessions and (ii) a recovery point objective (RPO) that identifies a target period in which data for the particular storage object might be lost due to an incident; and
   wherein receiving the replication session data from the second storage node includes:
      acquiring, as at least a portion of the replication session data, the replication session identifier and the RPO from the second storage node.

6. A method as in claim 5 wherein establishing replication from the first storage node to the second storage node for the particular storage object further includes:
   establishing an asynchronous replication session between the first storage node and the second storage node based on the replication session identifier and the RPO from the second storage node.

7. A method as in claim 1, further comprising:
   while establishing replication from the first storage node to the second storage node for the particular storage object, concurrently establishing replication from the first storage node to the third storage node for the particular storage object.

8. A method as in claim 7 wherein establishing replication from the first storage node to the second storage node for the particular storage object further includes:
   establishing an asynchronous replication session between the first storage node and the second storage node for the particular storage object, and
   activating the asynchronous replication session to perform asynchronous replication from the first storage node to the second storage node for the particular storage object; and
   wherein concurrently establishing replication from the first storage node to the third storage node for the particular storage object includes:
      establishing a synchronous replication session between the first storage node and the third storage node for the particular storage object, and
      activating the synchronous replication session to perform synchronous replication from the first storage node to the third storage node for the particular storage object.

9. A method as in claim 8 wherein activating the asynchronous replication session includes transitioning the asynchronous replication session to an active state; and
wherein the method further comprises:
after the asynchronous replication session has been in the active state for a period of time, transitioning the asynchronous replication session from the active state to a hibernated state to deactivate replication from the first storage node to the second storage node for the particular storage object and enable the third storage node to perform replication to the second storage node for the particular storage object.

10. A method as in claim 1, further comprising:
prior to sending the replication query to the second storage node, performing replication to the second storage node for the particular storage object, and
terminating replication to the second storage node for the particular storage object.

11. A method as in claim 10 wherein performing replication to the second storage node for the particular storage object includes:
establishing an asynchronous replication session between the first storage node and the second storage node for the particular storage object, and
activating the asynchronous replication session to perform asynchronous, replication from the first storage node to the second storage node for the particular storage object; and
wherein terminating replication to the second storage node for the particular storage object includes:
deactivating the asynchronous replication session in response to a failover event.

12. A method as in claim 11 wherein activating the asynchronous replication session includes transitioning the asynchronous replication session to an active state;
wherein deactivating the asynchronous replication session includes transitioning the asynchronous replication session from the active state to a hibernated state; and
wherein establishing replication from the first storage node to the second storage node for the particular storage object includes transitioning the asynchronous replication session from the hibernated state back to the active state to reactivate the asynchronous replication session.

13. A method as in claim 1 wherein sending the replication query to the second storage node includes:
directing the second storage node to provide a list of replication sessions established between the third storage node and the second storage node.

14. A method as in claim 13 wherein receiving the replication session data from the second storage node includes:
obtaining the list of replication sessions established between the third storage node and the second storage node, the list of replication sessions identifying multiple inactive replication sessions established between the third storage node and the second storage node.

15. A method as in claim 14, further comprising:
while establishing replication from the first storage node to the second storage node for the particular storage object, establishing replication from the first storage node to the second storage node for other storage objects based on the multiple inactive replication sessions identified by the list.

16. A method as in claim 1 wherein, prior to establishing replication from the first storage node to the second storage node for the particular storage object, an earlier asynchronous replication session from the third storage node to the second storage node for the particular storage object is hibernated; and
wherein establishing replication from the first storage node to the second storage node for the particular storage object includes:
reusing internal replication components at the second storage node to perform asynchronous replication from the first storage node to the second storage node.

17. A method as in claim 1 wherein, prior to sending the replication query, asynchronous replication is performed to the third storage node from the second storage node for the particular storage object; and
wherein sending the replication query to the second storage node includes:
providing the replication query to the second storage node after the asynchronous replication to the third storage node from the second storage node for the particular storage object has been terminated.

18. Data storage equipment operating as a first storage node, comprising:
a communications interface;
memory; and
control circuitry coupled with the communications interface and the memory, the memory storing instructions which, when carried out by the control circuitry, causing the control circuitry to:
send a replication query to a second storage node through the communications interface,
in response to the replication query sent to the second storage node, receive replication session data from the second storage node through the communications interface, the replication session data describing replication which has terminated between a third storage node and the second storage node for a particular storage object, and
based on the replication session data, establish replication to the second storage node for the particular storage object to preserve use of the particular storage object;
wherein, prior to establishing replication from the first storage node to the second storage node, (i) a current version of the particular storage object resides on the first storage node and (ii) a non-current version of the particular storage object resides on the second storage node; and
wherein the control circuitry, when establishing replication from the first storage node to the second storage node for the particular storage object, is constructed and arranged to:
update the non-current version of the particular storage object residing on the second storage node to match the current version of the particular storage object residing on the first storage node.

19. A computer program product having a non-transitory computer readable medium which stores a set of instructions to preserve replication to a storage node; the set of instructions, when carried out by a first storage node, causing the first storage node to perform a method of:
from the first storage node, sending a replication query to a second storage node;
in response to the replication query sent to the second storage node, receiving replication session data from the second storage node, the replication session data describing replication which has terminated between a third storage node and the second storage node for a particular storage object; and based on the replication session data, establishing replication from the first storage node to the second storage node for the particular storage object to preserve use of the particular storage object;

wherein, prior to establishing replication from the first storage node to the second storage node, (i) a current version of the particular storage object resides on the first storage node and (ii) a non-current version of the particular storage object resides on the second storage node; and wherein establishing replication from the first storage node to the second storage node for the particular storage object includes:
updating the non-current version of the particular storage object residing on the second storage node to match the current version of the particular storage object residing on the first storage node.

20. A method of preserving replication to a storage node, the method comprising:

from a first storage node, sending a replication query to a second storage node;

in response to the replication query sent to the second storage node, receiving replication session data from the second storage node, the replication session data describing replication which has terminated between a third storage node and the second storage node for a particular storage object; and based on the replication session data, establishing replication from the first storage node to the second storage node for the particular storage object to preserve use of the particular storage object;

wherein the asynchronous replication from the third storage node to the second storage node for the particular storage object is performed via an asynchronous replication session between the third storage node and the second storage node having (i) a replication session identifier that uniquely identifies the asynchronous replication session among other replication sessions and (ii) a recovery point objective (RPO) that identifies a target period in which data for the particular storage object might be lost due to an incident; and wherein receiving the replication session data from the second storage node includes:
acquiring, as at least a portion of the replication session data, the replication session identifier and the RPO from the second storage node.

21. A method of preserving replication to a storage node, the method comprising:

from a first storage node, sending a replication query to a second storage node;

in response to the replication query sent to the second storage node, receiving replication session data from the second storage node, the replication session data describing replication which has terminated between a third storage node and the second storage node for a particular storage object; and based on the replication session data, establishing replication from the first storage node to the second storage node for the particular storage object to preserve use of the particular storage object;

wherein establishing replication from the first storage node to the second storage node for the particular storage object includes:
establishing an asynchronous replication session between the first storage node and the second storage node for the particular storage object, and
activating the asynchronous replication session to perform asynchronous replication from the first storage node to the second storage node for the particular storage object; and wherein concurrently establishing replication from the first storage node to the third storage node for the particular storage object includes:
establishing a synchronous replication session between the first storage node and the third storage node for the particular storage object, and
activating the synchronous replication session to perform synchronous replication from the first storage node to the third storage node for the particular storage object.

22. A method of preserving replication to a storage node, the method comprising:

from a first storage node, sending a replication query to a second storage node;

in response to the replication query sent to the second storage node, receiving replication session data from the second storage node, the replication session data describing replication which has terminated between a third storage node and the second storage node for a particular storage object; and based on the replication session data, establishing replication from the first storage node to the second storage node for the particular storage object to preserve use of the particular storage object;

wherein performing replication to the second storage node for the particular storage object includes:
establishing an asynchronous replication session between the first storage node and the second storage node for the particular storage object, and
activating the asynchronous replication session to perform synchronous replication from the first storage node to the second storage node for the particular storage object; and wherein terminating replication to the second storage node for the particular storage object includes:
deactivating the asynchronous replication session in response to a failover event.

* * * * *